Sept. 2, 1941.  H. GAMACHE  2,254,738

CUTTING TOOL

Filed Feb. 7, 1939

INVENTOR.
HOMER GAMACHE,
BY George D. Richards
ATTORNEY.

Patented Sept. 2, 1941

2,254,738

UNITED STATES PATENT OFFICE 2,254,738

CUTTING TOOL

Homer Gamache, Newark, N. J., assignor to Acme Metal Goods Manufacturing Co., Newark, N. J., a firm composed of August C. Fischer and Charles Fischer Application February 7, 1939, Serial No. 255,128

3 Claims. (Cl. 30—175)

This invention relates to a novel cutting tool for slicing and dicing vegetables and for similar operations.

The invention has for an object to provide a simple, efficient and easily operated cutting tool adapted for use in cutting, slicing or dicing vegetable and like materials or substances; as e. g. the transverse cutting into pieces or dice of string beans or other slender vegetable or prepared lengths of vegetables and other materials or substances.

The invention has for a further object to provide a novel cutting tool for the purposes stated comprising, a body arranged to provide a pair of resiliently opposed arms movable by applied pressure one toward the other; one of said arms having at its free end a supporting plate for the substance of material to be cut, and the other arm having at its free end a cutting blade opposed to and reciprocable relative to said supporting plate.

The invention has for another object to provide, in connection with the supporting plate of the tool, means to receive the cutting edge of the tool blade so as to permit the latter to pass through or intersect the plane of the supporting plate; and the invention also has for an additional object to provide, in combination with the supporting plate and its carrying arm, a stop means for both positioning the material to be cut relative to the path of movement of the cutting blade, as well as to serve as a finger rest for conveniently locating the tool within the grasp of the user's hand.

Other objects of the invention not at this time more particularly enumerated, will be understood from the following detailed description of the same.

Figure 1:
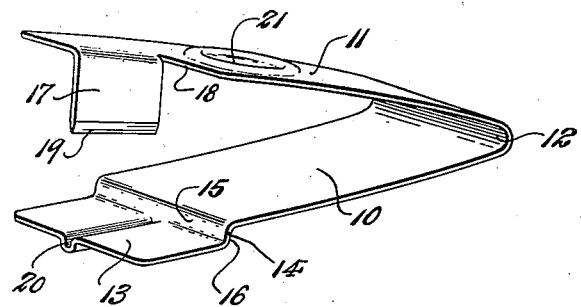
Figure 2:
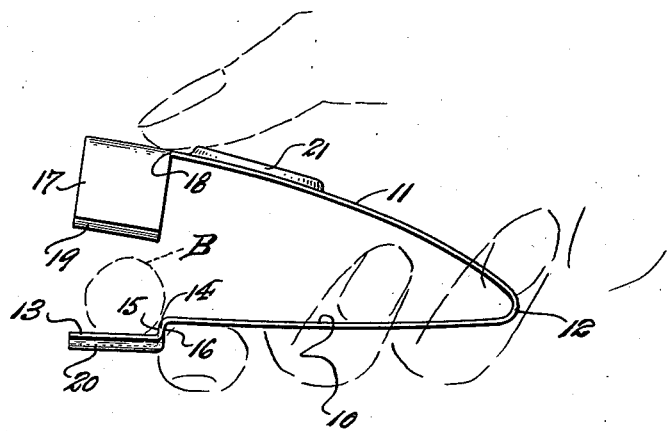
Figure 3:
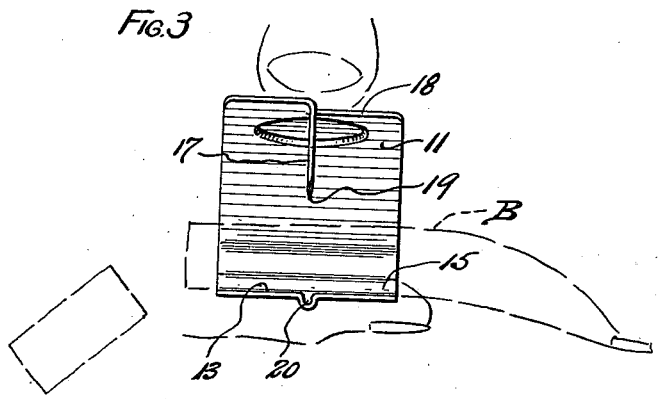
Figure 4:
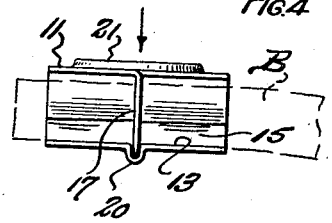

An illustrative embodiment of the novel cutting tool according to this invention is shown in the accompanying drawing, in which:

Fig. 1 is a perspective view of the novel cutting tool; Fig. 2 is a side elevation of the same, which also shows how the tool is grasped in the hand of the user when in use; Fig. 3 is a front end elevation of the tool in normal initial position, and Fig. 4 is a similar view of the same in cutting position.

Similar characters of reference are employed in the above described views, to indicate corresponding parts.

Referring to the drawing, the novel cutting tool, in a preferred form thereof, is produced by metal stamping operations from sheet metal of suitable kind and character. The tool comprises a body portion of suitable length doubled lengthwise upon itself to provide a lower arm 10 and an upper arm 11. Said arms 10 and 11 are normally tensionally divergent, and since the body portion from which they are produced is composed of springy metal, the juncture 12 of said arms constitutes a spring section adapted to resiliently oppose said arms in normal divergent relation.

Formed in connection with the outer or free end portion of said lower arm 10 is an outwardly extending supporting plate 13 downwardly offset by a shoulder forming connection 14 to a plane below but substantially parallel to the plane of said lower arm 10. The outer or front face 15 of said connection 14 provides a stop shoulder at the rearward or inward side of said supporting plate 13 and angular to the plane of the latter. This stop shoulder 15 engages the side of the material B, when the latter is applied over and upon the supporting plate, thus disposing the material in position to be operatively engaged by the cutting blade of the tool, as hereinafter mentioned. The inner or rear face 16 of said connection 14 provides a stop shoulder beneath and angular to the underside of the arm 10; this stop shoulder 16 being engageable by the forefinger of the user's hand wherein the tool is grasped so as to conveniently locate and hold the tool against displacement from the grasp of the hand (see Fig. 2).

Formed in connection with the outer or free end portion of the upper arm 11 is a cutting blade 17. Preferably this cutting blade is formed by a section of the end portion of the arm 11 severed along a transverse line 18 extending part way across the same; said section being thereupon turned downward into a plane substantially perpendicular to the plane of said arm 11, and aligned more or less parallel to the longitudinal axis of said arm 11. The cutting blade 17 thus formed is provided with a sharpened bottom cutting edge 19. The cutting blade 17 is transverse to the width of the supporting plate 13, and angularly disposed to the lateral axis of the latter.

Formed in said supporting plate 13, for aligned opposition to the cutting edge 19 of the blade 17, is a depressed channeled or grooved portion 20 intersecting and projecting below the plane of the top supporting surface of said plate 13.

If desired the body of the upper arm 11 may be provided with a stiffening annular boss 21 which serves both to reenforce or stiffen this arm, and also as a seating means for the thumb of the user's hand by which the tool is grasped.

In use of the novel tool, the same is grasped in the user's hand, in the manner shown in Fig. 2, and a length of material B desired to be cut is engaged upon the top surface of the supporting plate 13 and beneath the raised cutting blade 17. When the material is thus disposed, the user, by exerting a squeezing pressure on the arms 10 and 11, thereby moves the same one toward the other, thus causing the cutting blade 17 to descend and shear through the material B. A complete shearing cut is assured by reason of the fact that the cutting edge 19 of the blade 17 is permitted to descend into the channeled or grooved portion 20 (see Fig. 4), being thus caused to pass below the supporting plane of the plate 13, and consequently entirely and cleanly through the material B. These operations may be successively repeated by advancing the length of material B over the supporting plate 13 after each cut, thus successively severing the length of material B into short pieces, dice or the like.

Having described my invention, I claim:

1. A cutting tool for the purposes described comprising, a pair of resiliently opposed arms, one arm having a supporting plate at its free end to receive and back the material to be cut, and a cutting blade at the free end of the other arm and disposed to oppose said supporting plate, said cutting blade comprising a section of said last named arm severed along a transverse line extending part way across the width of said latter arm, said section being down-turned to a plane angular to the plane and substantially parallel to the longitudinal axis of said latter arm and perpendicular to the plane of said supporting plate, and said blade section having a sharpened bottom edge.

2. A cutting tool for the purposes described comprising, a pair of resiliently opposed arms, one arm having at its free end a flat supporting plate disposed in horizontal plane to receive and back the material to be cut, the other arm having a cutting blade dependant from its free end portion in a plane perpendicular to the plane of said supporting plate and substantially parallel to the longitudinal axis of said arms, the bottom margin of said blade having a sharpened edge coincident with the length thereof, and said supporting plate having an upwardly open channeled portion opposed to said blade so as to receive and permit the blade cutting edge to intersect the plane of said supporting plate during its cutting stroke.

3. A cutting tool formed from a single piece of sheet metal doubled upon itself to provide a pair of resiliently opposed arms, one arm being formed at its free end to provide a downwardly offset flat supporting plate to receive and back the material to be cut, a cutting blade at the free end of the other arm to oppose said supporting plate, said cutting blade comprising a section of said last named arm severed therefrom along a transverse line extending part way across the width of said latter arm, said section being down-turned to a plane angular to the plane of said latter arm and perpendicular to the plane of said supporting plate, said blade section having a straight sharpened bottom edge, and said supporting plate having an upwardly open channeled portion opposed to said blade so as to permit the blade cutting edge to intersect the plane of said supporting plate during its cutting stroke.

HOMER GAMACHE.